CARTONING METHOD AND APPARATUS

Filed July 7, 1955 6 Sheets-Sheet 1

INVENTOR
VERRIS C. WARDELL
BY
Curtis, Morris & Safford
ATTORNEYS

Oct. 18, 1960 V. C. WARDELL 2,956,382

CARTONING METHOD AND APPARATUS

Filed July 7, 1955 6 Sheets-Sheet 2

INVENTOR
VERRIS C. WARDELL
BY
Curtis, Morris & Safford
ATTORNEYS

CARTONING METHOD AND APPARATUS

Filed July 7, 1955 6 Sheets-Sheet 3

INVENTOR
VERRIS C. WARDELL
BY
Curtis, Morris & Safford
ATTORNEYS

INVENTOR.
VERRIS C. WARDELL
BY
Curtis, Morris & Safford
ATTORNEYS

CARTONING METHOD AND APPARATUS

Filed July 7, 1955

INVENTOR
VERRIS C. WARDELL
BY
Curtis, Morris & Safford
ATTORNEYS

Oct. 18, 1960 V. C. WARDELL 2,956,382
CARTONING METHOD AND APPARATUS
Filed July 7, 1955 6 Sheets-Sheet 6

INVENTOR.
VERRIS C. WARDELL
BY
Curtis, Morris & Safford
ATTORNEYS

United States Patent Office 2,956,382
Patented Oct. 18, 1960

2,956,382

CARTONING METHOD AND APPARATUS

Verris C. Wardell, 1 New York Ave., Rockville Centre, N.Y.

Filed July 7, 1955, Ser. No. 520,518

22 Claims. (Cl. 53—35)

Figure 1A:
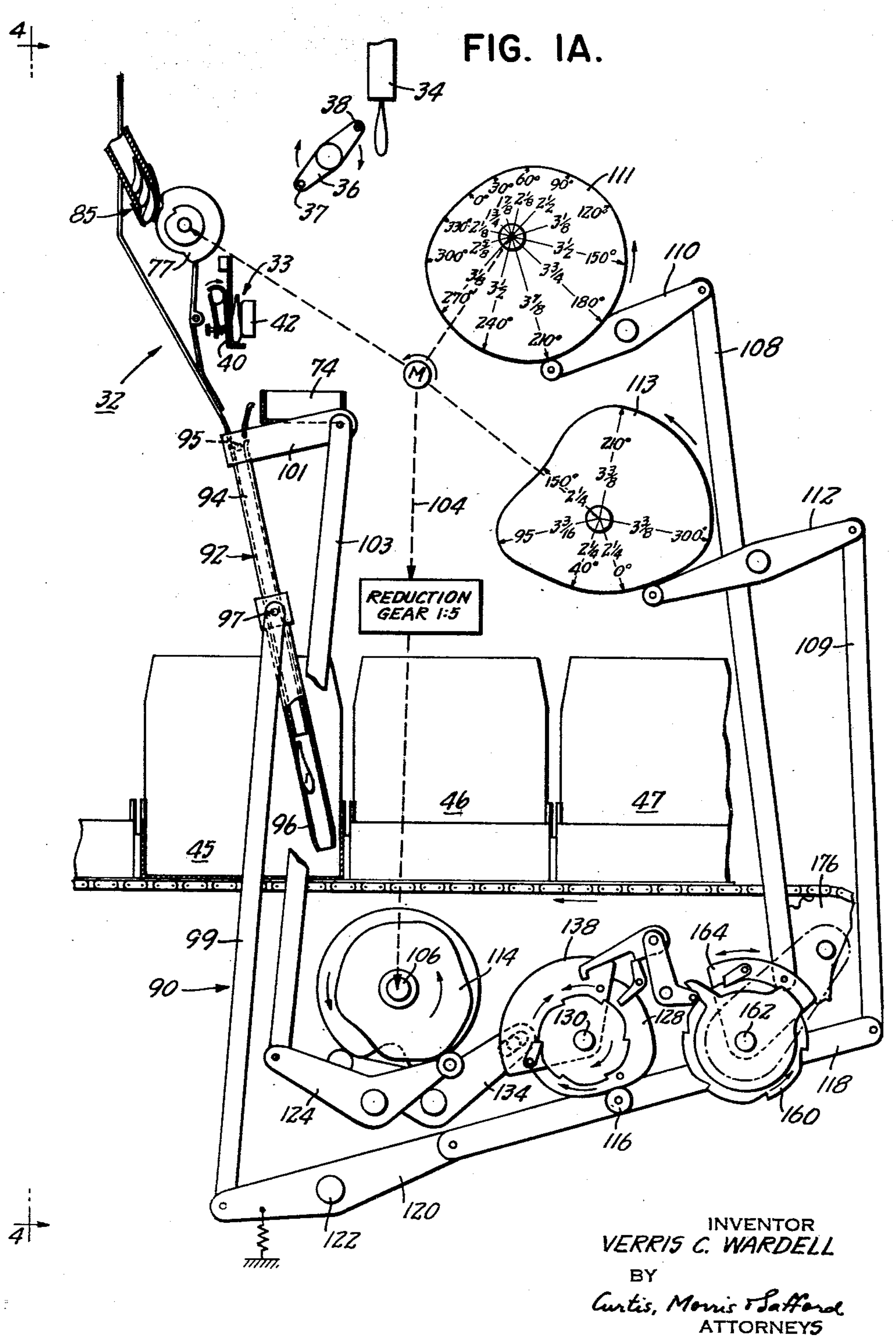
Figure 1B:
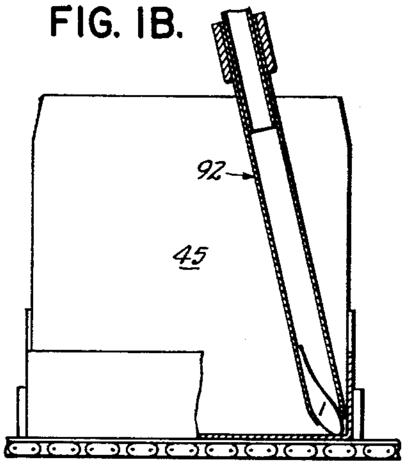

This invention relates to a method and apparatus for placing small individual packages into cartons, and in particular it relates to the cartoning of soft envelope-like packages, of uneven shape, such as tea bags.

An object of this invention is to provide for the continuous, high-speed and orderly packing of individual articles into larger cartons.

Another object is to provide such packing with a highly flexible order or pattern of packing which can easily be changed as desired.

A further object is to provide for the continuous and high-speed packing of soft, fragile articles of uneven shape, such as tea bags, into larger cartons neatly and with a minimum of waste space between the articles after they are packed in the cartons.

The packing of tea bags is customarily done by hand even though the bag making operations are carried out on high-speed automatic machinery. This surprising situation exists because the apparently simple process of cartoning the individual tea bags once they are made has seemed to defy mechanization. Tea bags, being limp, uneven in shape, and relatively fragile, are very difficult to handle by machinery because most mechanical mechanisms heretofore used for this purpose do not have sufficient dexterity to grasp a tea bag positively and with practically lightning speed but yet gently and in proper orientation time after time. As a result, bag cartoning machines which are commercially in use generally know, so to speak, only simple-minded packing principles, two very popular ones being the stack-by-stack principle and the random principle.

With the first of these, for example, a number of tea bags are collected in a row until a stack of desired size is accumulated and then the stack as a unit is pushed into a receiving carton, one or more stacks being placed in the carton depending on its size. This way of packing tea bags requires rather intricate mechanisms for collecting the tea bags in a stack and suffers from the disadvantage that the bags are not packed in the cartons in the most convenient way for the user to remove them. The bags when packed stack-by-stack lie in the cartons much like soda crackers face to face and standing on end. When the first bag is removed it tends to bring with it the bags on each side so that thereafter the bags become more and more tangled together.

A second disadvantage with this way of cartoning is that it is not so adaptable for use with various size cartons as is, for example, hand cartoning. With hand cartoning, the bags can be laid in the carton in a pattern which makes most efficient use of the space in the carton regardless of the size and shape of this space. This is not true of stack-by-stack cartoning.

Random packing of tea bags wherein a measured number of bags are jammed into a carton helter-skelter suffers from most of the disadvantages of stack-by-stack cartoning and in addition gives a final product of such poor appearance that its salability is lessened. Therefore, this way of machine packing tea bags, in spite of its simplicity and versatility, is not widely favored.

When one realizes that the tea bag industry in the United States produces more than ten billion tea bags a year, a large number of which are packed in cartons, it is easy to appreciate the need for a simple high-speed bag cartoning machine. The present invention fulfills this need and, moreover, does so in a way very nearly as versatile, and just as gentle as hand cartoning of the bags.

In accordance with the present invention, the individual tea bags, as fast as they are received from even the highest speed bag making machine, are first properly oriented and then fed one by one to a cartoning chute. The bags are moved down this chute solely by gravity and are placed in a receiving carton underneath the chute in a desired laying pattern best suited to the particular size cartons being filled. This pattern is determined by moving the chute and carton relative to each other continuously while the carton is being filled and while the bags are falling rapidly down the chute. There is no interruption of the flow of bags down the chute while the carton is being filled and no interruption as the filled carton is removed and an empty one advanced to take its place. The bags are laid in each carton in flat layers parallel to the bottom of the carton and are thus easily removed thereafter by the user one at a time and without tangling. The pattern according to which the bags are laid in a carton can easily be changed to suit a particular size and shape of carton. Since the bags are neatly laid in a carton, the eye appeal of the product is much greater than for a carton packed helter-skelter. The method of packing tea bags according to this invention uses gravity to move the individual tea bags into the cartons and thus escapes needing complex, cumbersome, and expensive machinery to do this and the danger involved with such machinery of damage to the tea bags.

Figure 1C:
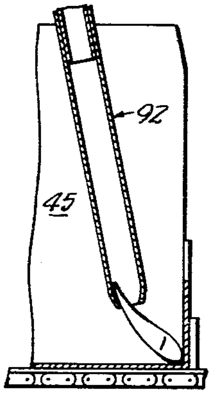
Figure 1D:
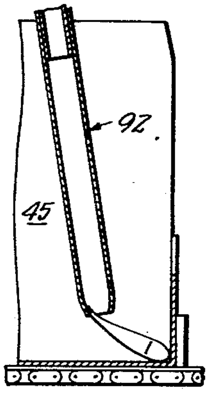
Figure 1E:
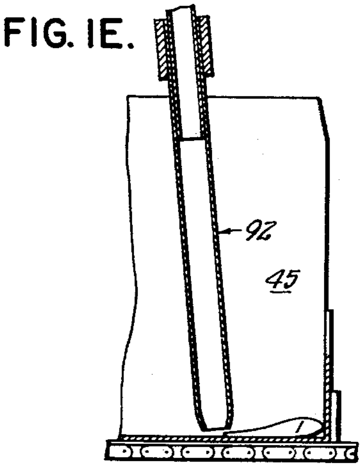
Figure 1F:
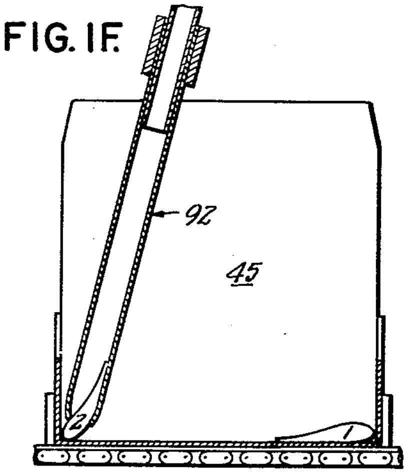
Figure 1G:
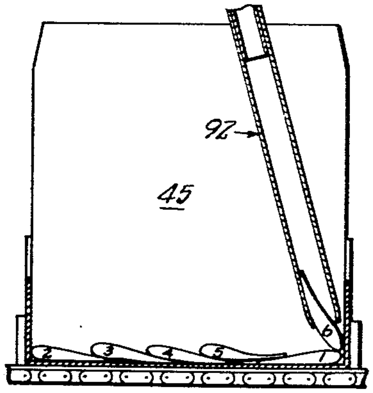
Figure 2A:
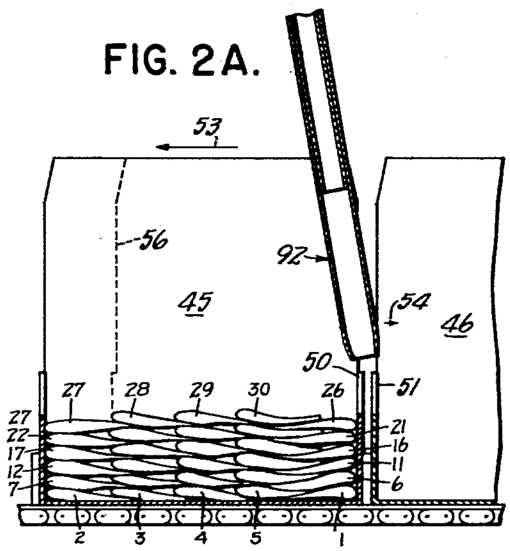
Figure 2B:
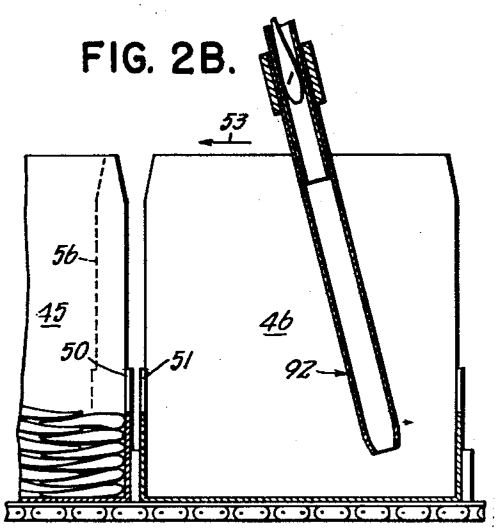
Figure 3:
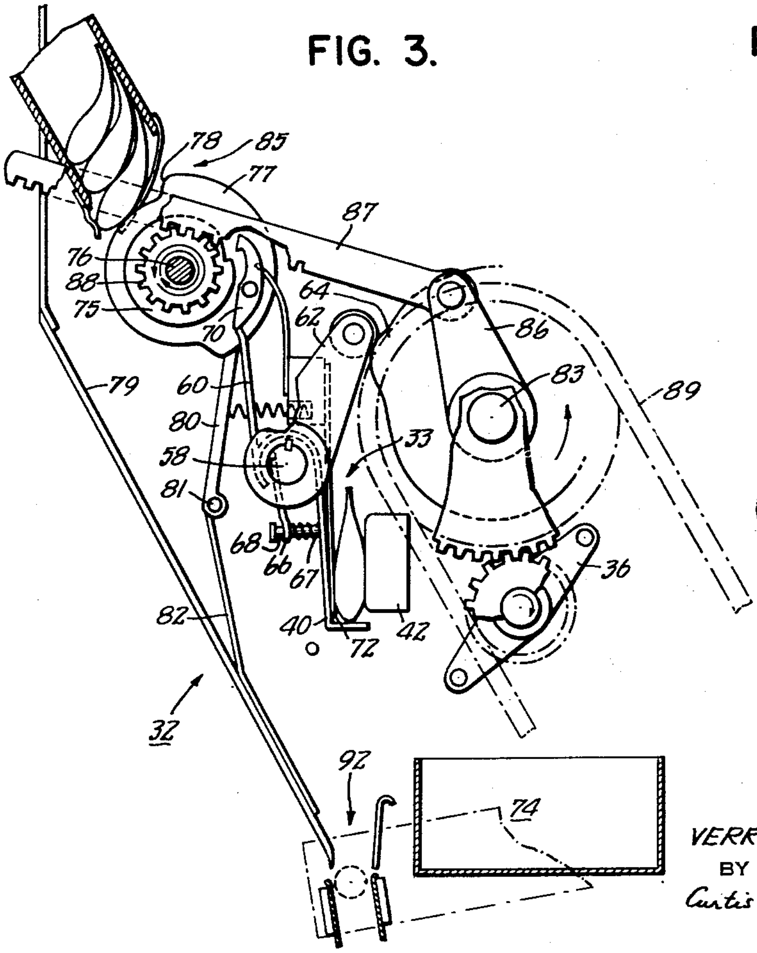
Figure 4:
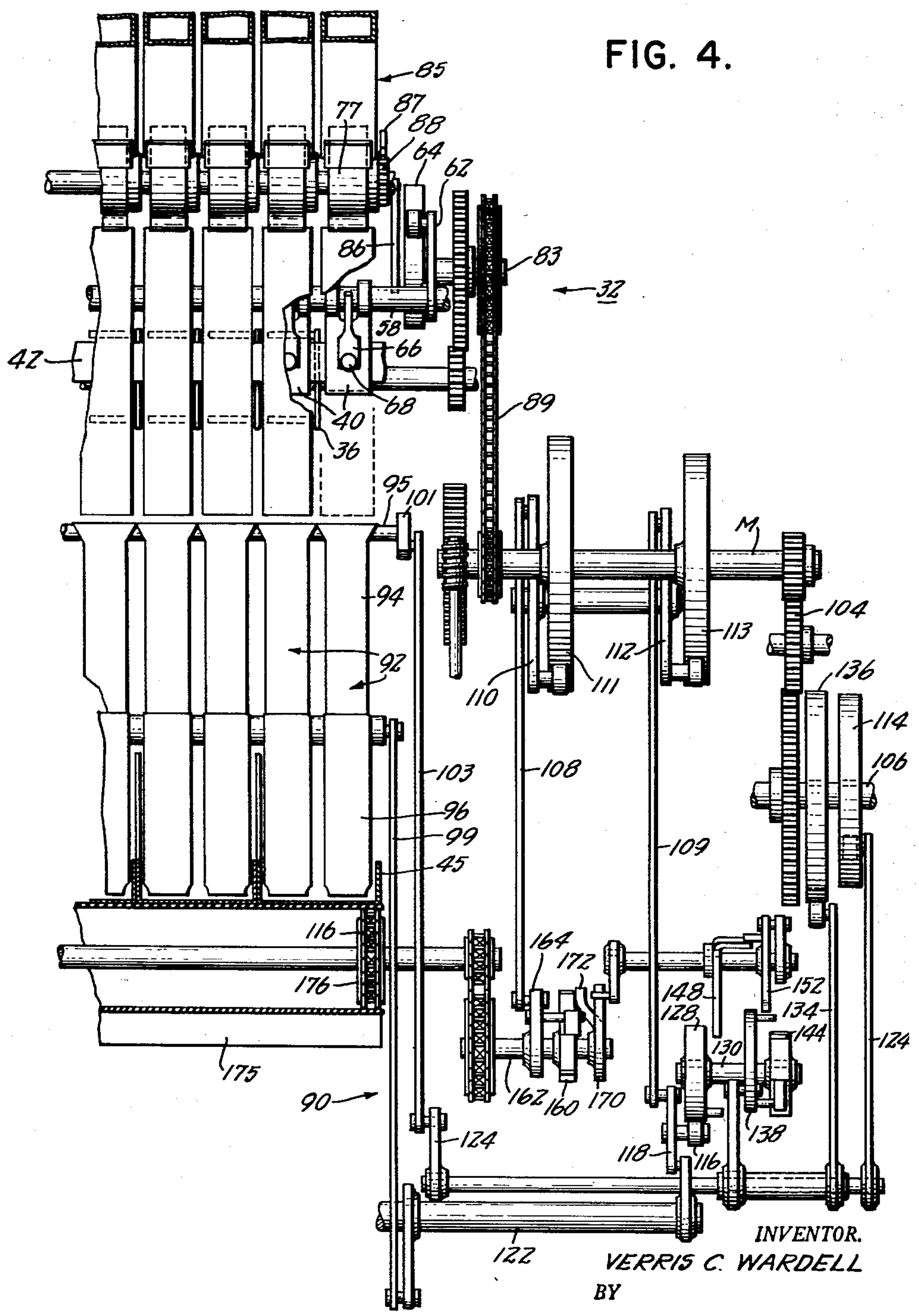
Figure 5:
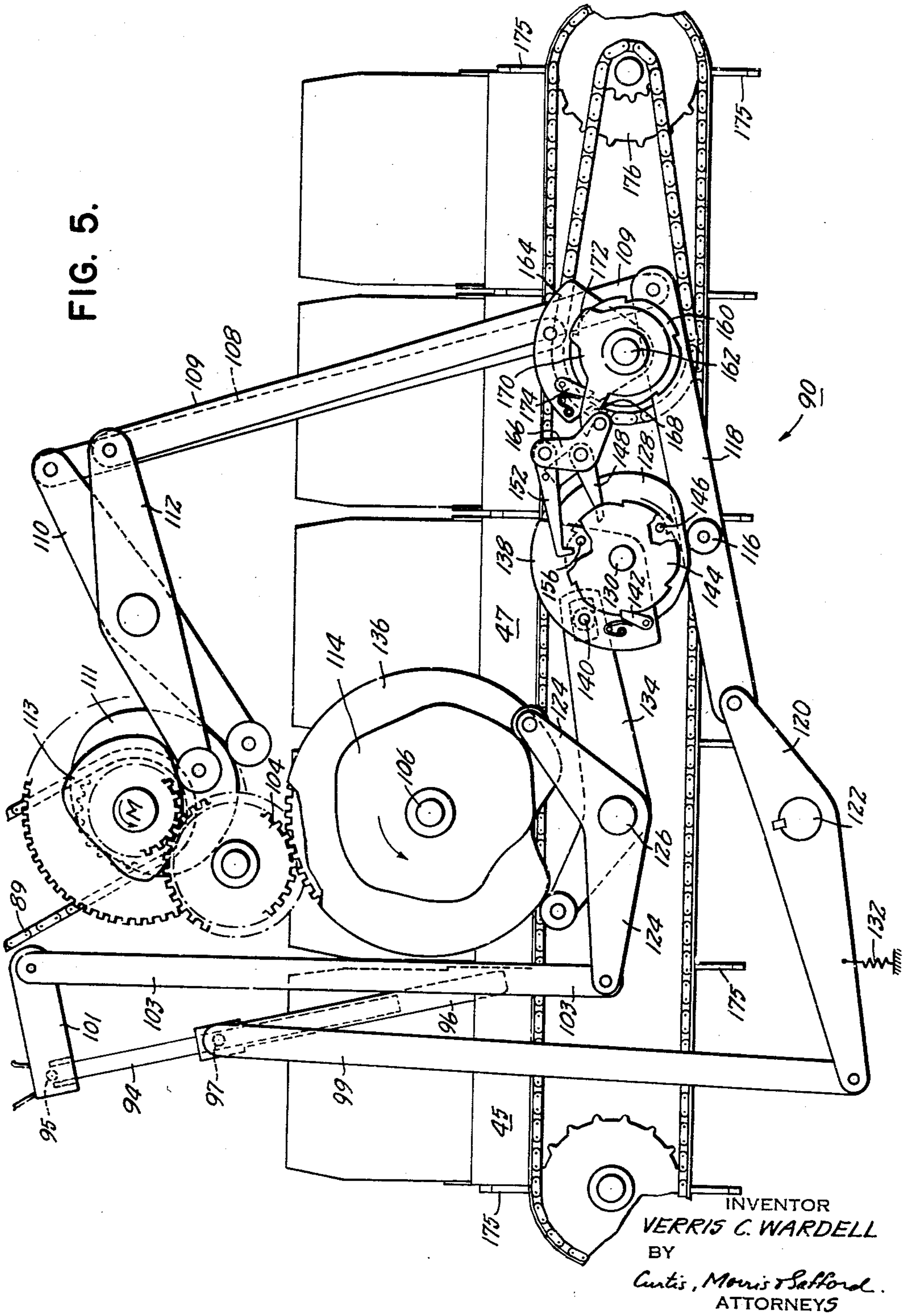
Figure 6:
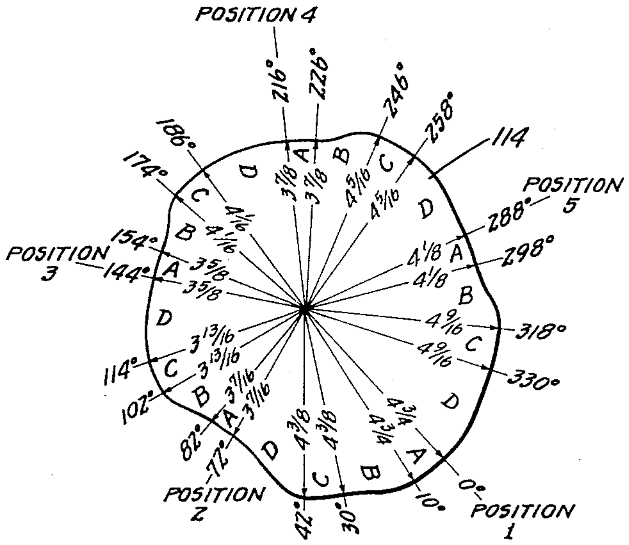
Figure 7:
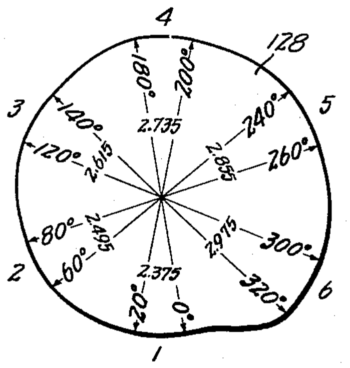
Figure 8:
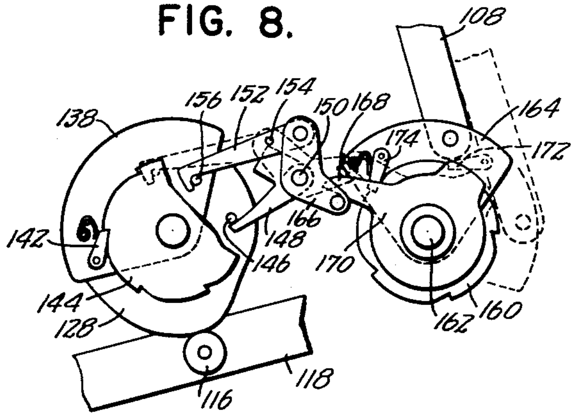
Figure 9:
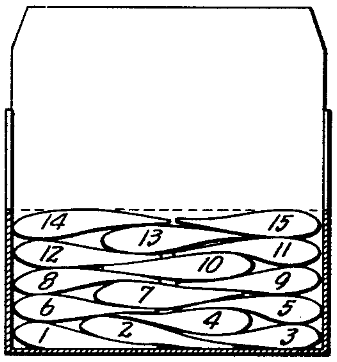

A better understanding of the invention together with a fuller appreciation of its many advantages will best be gained from the following description given in connection with the accompanying drawings in which:

Figure 1A is a schematic side view illustrating the method of packing tea bags according to the invention and showing a simple apparatus for performing it, Figures 1B, 1C, 1D, 1E, 1F and 1G show at successively later times the packing of the bags by the apparatus of Figure 1A, Figures 2A, 2B and 2C are successive views of the embodiment of Figure 1A in transition from packing one carton to packing the next, Figure 3 is a detailed side view of the bag testing and supply mechanism shown schematically in the upper left portion of Figure 1A, Figure 4 is an end view taken as indicated by lines 4—4 in Figure 1A and showing particular details of the bag testing and supply mechanism and general details of the rest of the embodiment of Figure 1A, Figure 5 is a detailed side view of the carton loading and feeding mechanism shown schematically in Figure 1A, Figure 6 is a more detailed view of the pattern cam shown in Figure 5, Figure 7 is a more detailed view of the layer cam shown in Figure 5, Figure 8 is a view with other parts broken away of the trigger mechanism shown in Figure 5 and shown here cocked in full line and fired in dotted line, and Figure 9 illustrates a carton packed with tea bags in a different pattern to show the versatility of the method and apparatus of the invention.

Referring now to Figure 1A, the apparatus indicated schematically and which embodies features of the invention includes a bag testing and supply mechanism, generally indicated at 32, which co-operates in supplying tea bags at definite times to a carton loading and feeding mechanism, generally indicated at 90.

The machine which makes the tea bags and supplies them to the testing mechanism 32 is not shown but can be one known to the art. However, the bag making machine described and claimed in co-pending application Serial No. 530,433, filing date August 25, 1955, now U.S. Patent 2,881,574, is particularly suitable for supplying mechanism 32 with tea bags.

As shown herein, the cartoning apparatus is adapted to accept a plurality of tea bags supplied to it at the same time by a bag making machine. To this end, there are provided a like plurality of bag testing mechanisms 32 and of carton loading mechanisms 90, these being arranged in a row perpendicular to the plane of Figure 1A. Each of the testing mechanisms 32 receives one of the tea bags supplied to this apparatus by the bag making machine. Each of these mechanisms 32 and 90 and its operation is like the corresponding ones seen in Figure 1A. The lateral spacing between these mechanisms perpendicular to the plane of Figure 1A can be seen in the end view of the apparatus given in Figure 4. They are driven in unison with each other as will appear so that, for example, a single actuating means for the testing mechanism 32 suffices to drive more than one of these mechanisms.

The cartoning apparatus shown in Figure 1A is powered by a main drive shaft M which rotates continuously counterclockwise. Let it be assumed that this drive shaft is synchronized with the bag making machine so that for each complete revolution of shaft M, a single tea bag is supplied to each testing mechanism 32.

The purpose of mechanism 32 is to insure that a perfectly formed tea bag is supplied to the carton loading mechanism 90 with each revolution of drive shaft M regardless of the possibility that at times a bag supplied from the bag making machine is defective for some reason.

Each bag is supplied from the right of mechanism 32 to its testing gate 33, being held during this movement to gate 33 by means of a swinging arm 34 from which the bag hangs. As the bag swings to the left, it passes over the beater arm 36 whose function is to test the bag for mechanical soundness. Arm 36 rotates relatively rapidly clockwise and carries projecting from its ends the two parallel rods 37 and 38. These rods, as a tea bag passes, beat it several times. If the bag is properly formed it will be delivered intact to testing gate 33; if the bag is not properly formed its contents, the loose tea, will be wholly or partly shaken out by the beater arm 36. The bag will then be delivered to the testing gate with less than a normal quantity of tea in it.

After a bag has been deposited by arm 34 in testing gate 33, its left arm 40, which is L-shaped, and upon which the bag is deposited by arm 34, is urged counterclockwise to the right. If the bag is perfectly formed, i.e. if it still contains a full quantity of tea, it will come to rest against the fixed right arm 42 of the gate and prevent left arm 40 from swinging more than a small distance from its normal position. On the return stroke of the mechanism (to be described in detail in connection with Figure 3) which oscillates left arm 40 first to the right and then to the left, this arm is moved sufficiently to the left to permit the bag then in the testing gate to fall downward. Since, for the testing cycle just outlined, the bag prevented left arm 40 from moving more than a small distance to the right, a trigger, to be described later, was not actuated and this bag is permitted to fall downward to the carton loading mechanism 90. Alternatively, if the bag supplied to testing gate 32 had been defective, left arm 40 would have swung to the right enough to actuate the trigger, the defective bag would be dropped to a reject tray, and a perfect bag obtained from the replacement bag magazine, generally indicated at 85, would be dropped to carton loading mechanism 90. In any event, for each revolution of main shaft M a perfect bag is dropped to this mechanism.

Still referring to Figure 1A, each perfect bag which is dropped downward, either from gate 32 or magazine 85, falls into a rectangular chute 92 down which it is guided into a carton positioned at the lower end of the chute and waiting to be filled. A tea bag, designated number 1, is pictured here at an instant during its fall down chute 92 near the lower end thereof and just before it falls into the carton now first in line and designated by number 45. Before bag 1 falls out the bottom end of chute 92, however, this end is moved from its position as shown in Figure 1A toward the position of Figure 1B so that the bag when it does emerge from the end of the chute will be "spotted" in the desired position in the carton (in this case in the right hand corner) for loading. After the bottom of the bag has come in contact with the carton, that is, is spotted in the desired location, chute 92 is moved, as shown in Figures 1C, 1D and 1E, upward, across, and down to "lay" the bag oriented in a desired way along the bottom of the carton. It is to be understood, of course, that the movement of chute 92 is rapid and continuous and that bag 1 is spotted and laid before the next bag comes down the chute. Thus, chute 92 moves from its position shown in Figure 1E to the position of Figure 1F in time to spot bag 2 in proper position for most efficient packing in carton 25 and relative to bag 1.

The above described sequence of spotting and laying of each successive bag continues until, as shown in Figure 1G, a layer of bags has been laid along the bottom of the carton. Then, as shown in this figure, chute 92 is again swung to the right end of the carton and a new layer of bags laid upon the first is begun. Thus, layer by layer the carton is filled. For the apparatus as illustrated herein, there are five bags in each layer laid in the order shown in Figure 1G. Each succeeding layer will be like the first layer. Note that in the particular pattern illustrated, bag 1 in the first layer is spotted against the right end of the carton and then laid to the left, bag 2 is spotted against the left end, then laid to the right and bag 5 is spotted on top of bag 4 and laid to the right. It is to be understood, however, and this will be appreciated more fully hereinafter, that the particular bag laying pattern in a layer and the pattern from layer to layer can be varied as desired and are not restricted to those shown in Figure 1G.

After carton 45 has been filled with bags, in this case with six identical layers of five bags each, this carton is moved to the left to a collecting zone (not shown) and the next empty carton, a carton 46, is advanced to take its place. This advance is very rapid and as chute 92 is now being swung to the right to position it for spotting the first bag in carton 46 just as bag 1 was spotted in carton 45, carton 46 quickly passes chute 92. The advance of cartons 45 and 46 begins immediately after the laying of bag 5 in the top layer in Figure 2A and proceeds quickly enough so that as the normal upward movement of chute 92 brings to or near its zenith, the end flaps 50 and 51 of cartons 45 and 46 respectively, are passing under the chute. As seen in Figure 2A, cartons 45 and 46 are moving to the left with a relative velocity indicated by the arrow 53, and chute 92 is moving in the opposite direction with a very small relative velocity indicated by the arrow 54. Carton 46 is being advanced to the position indicated by the dotted line 56, which is the position formerly occupied by now filled carton 45.

Figure 2C:
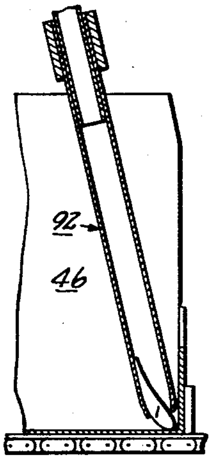

After chute 92 passes flaps 50 and 51 it is lowered, even while still swinging to the right, into carton 46. This is indicated in Figure 2B. As soon as carton 46 arrives in position and is stopped, as shown in Figure 2C, the first bag, designated by number 1, falls down chute 92 and is spotted and laid in the identical way described in connection with Figures 1B through 1E. Carton 46 is filled with bags in precisely the same manner as carton 45 was filled and this filling operation is adapted to continue, without variation and without interruption in the steady flow of tea bags, carton after carton. The mechanism which advances the cartons and moves the chute 92 will be fully described hereinafter.

Referring now to Figure 3, there is shown herein in more detail the bag testing mechanism 32 described and shown previously only schematically. This mechanism includes the testing gate 33 and, actuated by this gate in the event a defective bag is supplied by the bag making machine, a magazine 85 for supplying perfect bags. Gate 33 includes an L-shaped arm 40 which swings to and from the fixed arm 42 to the right of it. Arm 40 is freely pivoted around the shaft 58 and carries an upwardly extending arm 60. As seen in Figure 3, arm 40 is resting in its normal position. When a bag is deposited upon it, shaft 58 is rocked or oscillated counter-clockwise by means of the crank arm 62 which is spring urged to follow the continuously counter-clockwise rotating cam 64. This counter-clockwise rocking of shaft 58 is transmitted into a force urging L-shaped arm 40 to the right by means of the arm 66 which is fixed to shaft 58 and the spring 67, which is mounted on a rod 68 fixed to the side of arm 40. This spring 67 is adapted to be compressed between arms 66 and 40 when shaft 58 moves counter-clockwise.

Assuming that a perfectly formed bag is resting on arm 40 when shaft 58 begins to move counter-clockwise, after a short movement to the right arm 40 will be stopped by the bag coming in contact with fixed arm 42 and thereafter, during this rotation of shaft 58, spring 67 will merely be compressed more without moving arm 40. The parts of this mechanism are adjusted so that when a perfect bag is tested the arm 60 carried on the other end of L-shaped arm 40 will not be able to move far enough counter-clockwise to disengage the end of the pawl 70 upon which it rides. Accordingly, when shaft 58 now begins to rotate clockwise at the direction of cam 64, this pawl will not have been released.

Clockwise rotation of shaft 58 moves arm 66 to the left and causes it to come against the head of rod 68 and thus to pull L-shaped arm 40 to the left. As the latter swings to the left, the tea bag upon it is held by the thin leaf spring 72 until arm 40 clears the bag and it falls downward. Since pawl 70 was not released by the arm 60, the bag is counted as perfect and permitted to fall into chute 92.

Alternatively, if a bag being tested permits L-shaped arm 40 to move to the right enough to cause arm 60 to release pawl 70, the bag will be dropped into the reject tray 74 at the right of the upper end of chute 92 and a perfect bag will be released from magazine 85. This is accomplished as follows.

When arm 60 releases pawl 70, the latter engages a single tooth ratchet wheel 75 fixed to the continuously oscillating shaft 76. The time that shaft 76 begins to rotate counter-clockwise coincides with the time that pawl 70 can be released so that upon release of the pawl, the cam 77 upon which the pawl is pivotally carried and which idles on shaft 76, is rotated counter-clockwise exactly one revolution. During this revolution of cam 77, its surface 78 engages the bottom or end bag in the magazine 85 releasing the bag and allowing it to fall down the surface 79. While cam 77 is in the process of releasing a bag, it allows the arm 80, pivoted at 81 and spring urged counter-clockwise, to swing in this direction. The lower end 82 of this arm thus swings upward from surface 79 and underneath and across the bottom of L-shaped arm 40. Thus the defective bag dropped from the latter will be shunted to tray 74 and the perfect bag released from magazine 85 will fall into chute 92.

The mechanism which synchronizes the rotation of cam 77 with the swinging of L-shaped arm 40 includes the cam 64, already described, and the continuously rotating shaft 83 upon which this cam is fixed. Also fixed to this shaft in proper relation to the cam, is a crank arm 86 which carries pivoted to its end the rack 87. This rack engages a pinion 88 which is fixed to shaft 76. In this way, the continuous rotation of shaft 83, this shaft being driven by main shaft M through chain 89 at an appropriate speed, is converted into the oscillating rotation of shaft 76. The gear ratio of rack 87 and pinion 88 is such that shaft 76 makes a full revolution in one direction and then a full revolution in the other.

Upon completion of a full counter-clockwise revolution of cam 77, arm 60 comes into engagement with pawl 70 and lifts it out of the single tooth of ratchet 75, arm 80 has been moved clockwise and these parts once again occupy the positions shown in Figure 3. The next bag testing cycle then begins.

As mentioned previously, a single drive mechanism can be used to power a number of the bag testing mechanisms 32. Thus, as seen in the view of Figure 4, which is taken looking to the right at the left end of the mechanism shown in Figure 3, a single shaft 83, a single shaft 58, a single shaft 76 and a single cam 64 and crank arm 62 can be used to operate each of a number of the L-shaped arms 40 and the magazines 75. Each of the arms 40, of course, operates independently of the others even though all are driven by the same mechanism. As seen here in Figure 4, two chutes 92 together feed the single carton 45, while two other chutes 92 feed the carton to the left of carton 45, and so forth. These chutes are driven in unison in the manner described above by part of the carton loading and feeding mechanism 90. Each chute is supplied separately once each revolution of main shaft M with a perfect tea bag.

Referring once again to Figure 1A, it is seen that chute 92 is divided into two sections, the upper section 92 being pivoted at 95, the lower section 96 being fitted around the bottom end of the upper section and slidable trombone-fashion therealong. Section 96 is pivotally connected at 97 to a link 99 by means of which it is moved up and down on section 94. The latter section is fixed at its pivot point 95 to a crank arm 101 which in turn is pivoted on the end of a link 103. By means of these last, section 94 is continuously oscillated about its pivot 95. This oscillation and the up and down movement of section 96 are synchronized with each other and the position and movement of the cartons so that the bags falling down chute 92 are spotted and laid in the way previously described.

The mechanism 90 which moves chute 92 and advances the cartons is powered from the main drive shaft M by the gear chain, indicated by dotted line 104, running to the shaft 106 and by the links 108 and 109 which are driven up and down by their respective pivoted crank arms 110 and 112 riding on the separate cams 111 and 113, respectively, rotated by shaft M.

Chute 92 moves with a complex motion which perhaps can best be considered as the sum of several simple movements. It is continuously swung or oscillated as a pendulum about the pivot 95 and the length of the arc over which it is swung is approximately constant. However, though this arc is constant in length, more or less, it is being shifted in position from left to right and back again as required to lay the bags according to a previously determined laying pattern. The swinging of chute 92 is thus the sum of a relatively rapid oscillation superimposed on a slower back and forth shifting. This swinging is controlled as will appear, by the continuous rotation of the pattern cam 114 fixed to the continuously rotating shaft 106.

Superimposed upon the swinging of chute 92 is the up and down trombone-like movement of the lower section 96 of the chute. The movement of this section is made up of two parts, one being an up and down and relatively rapid oscillation over a track of approximately constant amplitude, the other being a slower step by step shifting of the oscillation track to raise or lower the bottom end of the chute in accordance with the number of layers already laid in a carton. The up and down oscillation of chute section 96 is controlled by the up and down reciprocation of link 109 in accordance with cam 113 upon which the crank arm 112 rides. The shape of cam 113 is substantially as shown here wherein the relative radii for various angular positions are given. The shifting of the oscillation track of section 96 is brought about by the shifting up and down of the fulcrum point 116 of the lever 118. This lever is pivoted at its right end to the lower end of the link 109, and at its left end is pivoted to a crank arm 120, this last also being pivoted to link 99 and rotatable about the fixed shaft 122.

The important details of the chute-moving mechanism and the carton-advancing mechanism are given in Figure 5. As already mentioned, the main drive shaft M rotates continuously and is positively geared to the shaft 106. The gear ratio is such, in the apparatus illustrated herein, that for five revolutions of shaft M, shaft 106 makes one revolution.

Fixed to shaft 106 and rotating continuously with it, is the pattern cam 114 which controls the swinging of chute 92 as it spots and lays each tea bag in the desired place in a carton. Cam 114 controls this swinging through the crank arm 124, which rides along and follows the cam and is pivoted around the fixed shaft 126. The other end of arm 124 is pivoted to the link 103 which in turn is pivoted to the short crank arm 101 fixed to the upper end of chute 92 at its pivot point 95. The shape of cam 114 required to bring about the laying pattern illustrated in Figures 1B through 1G will be set forth later in connection with Figure 6.

Still referring to Figure 5, lower section 96 of chute 92 is oscillated up and down by crank arm 112 acting through link 109, lever 118, crank arm 120 and link 99. The motion of crank arm 112 is controlled by cam 113 fixed directly on shaft M and imparting to crank 112 up and down reciprocation twice each revolution of shaft M. As seen in Figure 5, the elements of the various mechanisms occupy their positions just prior to the spotting of the first tea bag in an empty carton. Therefore, fulcrum point 116 on the lever 118 occupies its highest relative position. As a result, the lower end of chute 92 is oscillated in its lowest position relative to the carton being filled.

The relative position of the fulcrum 116 is determined by the shape and position of the layer cam 128 against which the fulcrum rides, the position shown being the nearest fulcrum 116 comes to the shaft 130 about which cam 128 idles. Fulcrum 116 is urged against cam 128 by the tension spring 132 connected to the left end of crank arm 120 and a fixed point.

Assuming for the moment that lever 118 is not being rocked about its fulcrum 116 and that link 109 is held stationary, it is easy to see that when this fulcrum is moved away from shaft 130 by cam 128, the left end of link 118 is swung down moving the left end of crank arm 120 upward and hence the lower end of chute 92 upward. Since this movement is independent of the oscillating movement imparted by link 109, the two movements merely add together and the "layer" position of chute 92, i.e. its height relative to a carton determined according to which layer of bags is being laid, is controlled by layer cam 128.

Layer cam 128 is rotated step by step as each layer of bags is laid down in a carton, making one full revolution during the complete loading of a carton. In the apparatus illustrated, since there are six layers of bags placed in each carton, there are six cam surfaces on layer cam 128, and the cam is rotated one-sixth of a revolution after each layer has been laid. Thus, at the proper time after the first layer of bags has been placed in the carton shown, cam 128 is rotated, here clockwise, and the next cam surface is advanced under fulcrum 116. This surface moves the fulcrum down by the amount necessary ot raise chute 92 enough to permit it to lay the second layer of bags. This step by step lowering of fulcrum 116 continues until the carton has been filled and the next carton advanced to filling position. At this point layer cam 128 has made a full revolution and returned to the position shown. The shape of cam 128 will be described more fully later in connection with Figure 7.

Referring still to Figure 5, layer cam 128 is rotated for each layer at the proper time and in the proper amount by means of the crank arm 134 pivoted on the fixed shaft 126 and riding on the intermediate cam 136, this last being coaxial with the pattern cam 114 and fixed to its shaft 106. Once during each revolution of cam 136, arm 134 is quickly allowed by it to rotate clockwise a short distance and is then quickly rotated in the opposite direction to its normal position as shown, this reciprocation taking place in a relatively short time. This reciprocation begins just after the last bag in each layer has been laid and before cam 114 returns to its starting position. When arm 134 moves clockwise its right end moves downward and pulls with it the fan-shaped sector 138 which is pivoted to the arm and also freely pivoted to the shaft 130. Backward movement of sector 138 brings the pawl 142 which it carries into engagement with the next preceding tooth (there are six teeth in all) on the ratchet wheel 144 which is fixed to the layer cam 128. Forward movement of sector 138 caused by arm 134 being returned to the position shown thereafter advances the layer cam one step, the amount of advance in the arrangement illustrated here being one-sixth of a revolution. Thus during each revolution of intermediate cam 136, the layer cam is revolved one-sixth of a revolution and the carton being filled by chute 92 with tea bags is filled layer by layer until full.

With the laying of the last bag in the last or top layer in the carton, and before layer cam 128 has been rotated back to the position shown, this full carton begins to be advanced to the collecting zone (not shown). The time at which this advance begins is determined by the position of the intermediate cam 136 and by a trigger mechanism, a drive mechanism, and the action of link 108 shortly to be described. In the embodiment described herein, the last bag, bag 30, in the top layer of a carton is laid next to the rightmost one (see Figure 2A), and the advance of the filled carton is begun as soon as bag 30 is laid. Since the chute is then only a short distance from the end flap of the carton, the carton can be moved this short distance in time enough for the flap to pass under the chute in the brief instant that the chute is at or near its zenith, as was previously indicated. To this end the intermediate cam 136 is timed to trigger the drive mechanism for advancing the cartons just after bag 30 in the top layer of a carton is completely laid. The triggering of the drive mechanism takes place just prior to the next step-advance or rotation of the layer cam 128 and is timed by the counter-clockwise rotation of the fan-shaped sector 138 previously described. Rotation of the layer cam 128, it should be remembered, takes place with the clockwise rotation of sector 138 after each counter-clockwise rotation thereof.

Referring to Figure 8, there is shown in solid line the cocked position just prior to being triggered of various elements which control the advance of cartons under the chute 92. The position of certain of these elements just after triggering and just before actuation by the upward stroke of link 108 is shown in dotted line. Layer cam 128 carries an outwardly projecting pin 146 which is adapted to engage and to rotate counter-clockwise the crank arm 148. This crank arm is pivoted on the fixed shaft 150 and is spring urged to the position shown in Figure 5. When depressed as shown in Figure 8, it releases the pawl 52 by moving from underneath the pin 154 carried on the pawl and allows the latter to drop down to the position shown. The fan shaped sector 138, previously described, is now resting in its farthest clockwise position and the end of pawl 152 engages the pin 156 carried on this sector. Thus, when the sector is moved back to the left, that is, counter-clockwise, pawl 152 will be drawn with it to the dotted line position. When this happens, a ratchet arrangement including the five-tooth ratchet wheel 160 fixed on the shaft 162 and the fan shaped sector 164 which idles on this shaft, being continuously oscillated back and forth by link 108, are coupled together and thereafter, upon the upstroke of link 108, advance an empty carton under chute 92.

The leftward pull given pawl 152 by sector 138 causes the lever arm 166 to which the pawl is pivoted and which itself is pivoted on shaft 150, to move counter-clockwise. The right end of lever arm 166 thereupon pushes against the finger 168 carried on the tooth cover 170 to rotate it clockwise around shaft 162. In moving clockwise, cover 170 uncovers the tooth at position 172 on ratchet wheel 160 and permits it to be engaged by the pawl 174 carried on the fan shaped sector 164 when this sector is in its farthest clockwise position indicated by dotted lines. Thereupon sector 164 and ratchet 160 are coupled together. All this occurs before the layer cam 128 begins its rotation from its sixth back to its first position, that is, before chute 92 is once again lowered from the top layer position.

As previously mentioned, the movement of link 108 is controlled by cam 111. The latter is shaped substantially as shown in Figure 1A wherein relative radii for various angular positions are given. Cam 111 imparts to link 108 single back and forth reciprocation once each revolution of main shaft M. Thus, in Figure 8 the coupling of the sector 164 to the ratchet 160 enables link 108 on its next upstroke to rotate shaft 162 counter-clockwise one-fifth of a revolution. This brings about the advance of an empty carton into loading position. The cartons are conveyed to this position by a chain conveyor having the pusher bars 175 spaced along it and which are adapted to propel the cartons. This conveyor chain is driven by a sprocket wheel 176 seen in Figure 5 and which in turn is driven from the shaft 162.

The normal rest position of the pawl 152 and the other elements of the trigger mechanism shown in Figure 8 is shown in Figure 5. In this normal position the tooth at position 172 of ratchet wheel 160 is covered and cannot be engaged by the pawl 174. As a result, though the fan shaped sector 164 oscillates about shaft 162, the latter does not move.

Since all the mechanical movements described herein are governed ultimately by the rotation of shaft M, these movements are perfectly timed and cannot fall out of synchronization. They can however be changed to give many different bag laying patterns from that shown in Figure 2A. The particular pattern cam 114 used in the apparatus described in Figure 5 has five surfaces, one corresponding to each bag in a layer. The shape of this cam can be determined empirically by moving the crank arm 124 back and forth by hand and by dropping bags down chute 92 at widely spaced times, in other words, by operating the machine in very "slow motion" and outlining the shape of the cam as required, then cutting it to size. Similarly, the shape of the layer cam 128 for a particular pattern can be determined empirically. The shapes of the cams 111 and 113, once set, usually need not be changed even though the laying pattern is varied. Thus, to change the pattern, all that is required is the changing of the pattern cam 114 and/or the layer cam 128. When cam 114 is changed, the speed of shaft 106 must, of course, be readjusted.

The shape of the pattern cam 114 required for the layer pattern shown in Figure 2A is given in detail in Figure 6. There are five positions on this cam with position 1 corresponding to the spotting of the first bag in the layer and position 5, the last. Since, for the layer pattern shown in Figure 2A, the first bag is spotted in the right hand corner of the carton and then laid to the left, and the second bag is spotted in the left hand corner and laid to the right, position 1 on cam 114 corresponds to its high point and position 2, to its low point. These positions are separated by 72 degrees angularly, this 72 degrees, and each 72 degrees, being divided into the regions generally designated A, B, C, D. Region A between positions 1 and 2 allows for spotting the first bag; region B, for beginning the laying of it; region C, for completing the laying; and region D, for moving the chute to the position for spotting the next bag. The distances from the center of the cam 114 of these various regions between each of the positions 1 through 5 is given in units which are relative to each other. The absolute value of these units must be determined according to the particular scale factor introduced by the several linkages between cam 114 and chute 92.

The particular shape for layer cam 128 required for the six layer pattern of bags shown in Figure 2A is given in Figure 7. This cam has six surfaces 1 through 6 and the relative radii and angular positions of these surfaces are as shown. Surface 1 corresponds to the bottom layer in a carton and surface 6, to the top layer.

In the description of the structure shown in Figure 5, it was stated that the pattern cam 114 and the intermediate cam 136 are both fixed to shaft 106 and driven at the same speed. However, these cams can be driven at different rotational speeds relative to each other. The effect of doing so is illustrated in Figure 9 which shows a carton packed with fifteen bags laid in the order shown. Here, the laying pattern of the first three bags is not repeated in this carton since fifteen bags is the capacity of the carton. This particular pattern resulted from the intermediate cam 136 actuating crank arm 134 five times during a single complete revolution of pattern cam 114. In general, by driving these cams at different speeds, and/or shaping cam 136 to actuate crank 134 more than once a revolution, a great many different laying patterns can be obtained, and each different size carton can be filled according to a pattern particularly suited to it.

The above description is intended in illustration and not in limitation of the invention. Various minor changes and modifications in the method and apparatus illustrated may occur to those skilled in the art and these may be made without departing from the spirit or scope of the invention as set forth.

I claim:

1. The method of packing a plurality of tea bags or the like in a carton, said method comprising the steps of taking one bag at a time and dropping it down a guide chute, moving the guide chute and a receiving carton underneath the chute laterally and together relative to each other to spot each bag in a respective predetermined position in the carton, and then moving the guide and carton laterally and apart relative to each other to leave said bag in the carton in a respective predetermined orientation relative to the carton and the other bags therein prior to the spotting of the next bag and to position the guide chute for spotting the next bag.

2. The method of packing a plurality of envelope-like bags in a carton, said method comprising the steps of controllably guiding each bag edge-first, one at a time into the carton and bringing the bag to rest along its bottom edge at a desired position within the carton, and then controllably guiding the top edge of the bag toward a position substantially level with its bottom edge to give the bag a desired orientation within the carton and to lay it generally flat relative to the bottom of the carton.

3. The method as in claim 2 in which each bag is controllably guided by means of a thin, hollow chute, and in which the bottom of the chute is moved relative to the carton to bring the bottom edge of the bag to rest while the bag for part of its length is still within the chute, and in which thereafter the chute is moved sideways and upward relative to the carton to guide the top edge of the bag at least part way to its rest position.

4. The method as in claim 3 in which each bag is moved by gravity along the guide chute and in further combination with the step of supplying perfect bags to the chute at equally spaced intervals by eliminating imperfectly formed bags received from the usual supply source and substituting therefor perfectly formed bags from an auxiliary source, whereby each carton can be filled with a predetermined number of perfectly formed bags in a given number of said equally spaced intervals.

5. The method of packing a carton with a plurality of envelope-like bags having uneven shape, said method including the steps of laying three or more bags one at a time, overlapping each other, and generally flat along the bottom of the carton to give a layer substantially more uniform in thickness than a single bag, at least one bag in a layer substantially overlapping at least two other bags in a layer, and placing as many of such layers in the carton as required to fill the carton, each bag being controllably guided edge-first into the carton, its bottom edge being brought to rest and thereafter its top edge being controllably guided down to lay the bag in the desired pattern.

6. The method as in claim 5 wherein each bag is controllably guided by a thin, hollow chute down which the bags fall by gravity.

7. In a machine for packing a carton with a plurality of relatively soft fragile articles, the combination of a thin, hollow guide chute adapted to guide edge-first each of said articles one at a time as they fall by gravity into said carton, first means for moving the lower end of said chute continuously back and forth relative to the carton, second means for moving the lower end of said chute up and down relative to the carton, and coordinating means for timing and for interrelating the action of said first and second means with the falling of the articles down said guide chute so that each article will first be spotted in a respective predetermined position and then laid in a respective predetermined orientation before the next article falls down said chute.

8. The combination of elements as in claim 7 in which said first means includes a pattern cam whose shape and position give a corresponding lateral position for the lower end of said guide chute relative to the carton, and said second means includes a drive cam whose shape and position give a corresponding vertical position, and in which said coordinating means includes a continuously rotating drive shaft, and also includes means coupling said drive shaft with said pattern cam and with said drive cam in a way so that the lower end of said chute is continuously oscillated back and forth along a lateral track of approximately constant amplitude but varying lateral position relative to said carton, and is also continuously oscillated up and down along a vertical track of approximately constant amplitude but varying vertical position relative to said carton, whereby each article is spotted and laid in the carton in a pattern determined by said cams.

9. In a cartoning machine, a guide chute, pattern means for continuously oscillating the lower end of said chute relative to a carton back and forth along a lateral track of roughly constant amplitude but changing position, laying means for continuously oscillating the lower end of said chute relative to the carton up and down along a vertical track of roughly constant amplitude but changeable vertical position, and layer means controlled by said pattern means for advancing the vertical position of said vertical track one step at a time to fill the carton layer by layer, said pattern means and laying means being synchronized so that an article guided by said chute is first brought to rest in a receiving carton while still engaged by said chute and thereafter is placed in desired orientation therein by said chute moving upward and sideways relative to said carton.

10. The combination of elements as in claim 9 in further combination with means for supplying properly formed articles to said guide chute unfailingly at equally spaced intervals, and carton advancing means for removing a filled carton and for advancing an empty one to take its place, said carton advancing means being actuated after a predetermined number of said intervals have occurred and being synchronized with said pattern means, laying means, and layer means so that after the last article is placed in a carton, an empty carton is advanced under the end of said chute just when the carton and chute are sufficiently apart vertically for the end flap of the carton to clear the lower end of the chute.

11. In a cartoning machine, an elongated, thin, guide chute for guiding articles edge-first into a receiving carton, said chute being pivoted at its upper end on a stationary, rotatable shaft, said chute having a lower end adapted to slide along the chute trombone fashion to shorten or lengthen the chute and thus to raise or lower said lower end relative to a receiving carton, pattern means for continuously swinging said chute pendulum fashion about said shaft along an arc of roughly constant length but varying lateral position, and laying means synchronized with said pattern means for continuously oscillating the lower end of said chute up and down along a track of roughly constant length whereby an article falling down said chute into the carton will be spotted and then laid by the chute in predetermined pattern.

12. The combination of elements as in claim 11 in which said pattern means includes a continuously rotating pattern cam whose shape and angular position control the swinging of said chute, and said laying means includes a continuously rotating cam whose shape and position control, through a lever pivoted at a fulcrum point, the trombone action of the lower end of said chute.

13. The combination of elements as in claim 12 in further combination with a rotatable layer cam for controlling the vertical position of the up and down oscillation track of the lower end of said chute, said layer cam being advanced one step at a time after each layer of articles has been placed in the carton, said layer cam controlling said vertical position by moving said fulcrum point.

14. In a cartoning machine wherein a guide chute is swung back and forth and moved up and down to place a plurality of envelope like articles one after another and layer by layer in a carton, a rotating pattern cam for controlling the swinging of the chute, a rotating driving cam for controlling the up and down movement of the chute, a rotatable layer cam for moving the chute step by step upward after each layer is placed in the carton and then downward, and a rotating intermediate cam for advancing said layer cam one step at a time after each layer of articles has been laid, said pattern cam, laying cam, and intermediate cam being rotated in synchronism.

15. The combination of elements as in claim 14 in further combination with carton advancing means including a trigger mechanism, said mechanism being cocked by said layer cam and fired by said intermediate cam whereby a carton is advanced in place under the chute before the layer cam has lowered the chute.

16. The method of arranging three or more tea bags or the like of uneven thickness in a flat layer of more even thickness in a receiving carton comprising the steps of controllably guiding each bag one at a time heavy-side first to rest in the carton, then laying its top edge down and thereafter laying successive bags in similar manner to complete the layer, the heavy sides of the two end bags of the layer being placed adjacent respective corners of the carton, at least one bag in the layer other than an end bag substantially overlapping two adjacent bags in the layer whereby the layer is approximately only as thick as the heavy side of a single bag.

17. The method as in claim 16 in which the last bag placed in the last layer in a filled carton is placed overlapping an end bag in the layer and laid in opposite sense relative thereto.

18. A cartoning machine comprising means for supplying properly formed tea bags or the like at each one of equally spaced intervals, a guide chute for receiving said bags and for guiding them edge-first as they fall by gravity into a receiving carton, said chute being thin, hollow and elongated and being pivoted at its upper end and having a lower section slidable trombone fashion to lengthen or shorten the chute, a continuously rotating pattern cam, a pivoted crank arm one end of which follows said pattern cam, a link pivoted at one end to the other end of said crank arm, a cantilever crank arm fixed to said chute at its pivot point and pivoted to the other end of said link completing the mechanical connection between said pattern cam and chute, means to slide the lower end of said chute up and down including a drive link pivoted at one end to said lower section, a second pivoted crank arm one end of which is pivoted to the other end of said drive link, a lever one end of which is pivoted to the other of said second crank arm, said lever having a fulcrum about which it rocks see-saw fashion, and means to actuate the other end of said lever, the action of said last means being synchronized with the rotation of said pattern cam so that the lower end of said guide chute is moved to first spot each bag in its respective position, and then to lay it in its respective orientation.

19. The combination of elements as in claim 18 in further combination with means to shift the position of the fulcrum of said lever and including a layer cam rotatable step-by-step and upon which said fulcrum bears, a continuously rotating intermediate cam, and a pivoted crank arm following said intermediate cam and adapted to advance said layer cam a fixed amount upon command.

20. The combination of elements as in claim 19 in further combination with carton advancing means including a conveyor and a drive shaft adapted to be coupled to a main drive shaft, and means for coupling said drive shaft to said main shaft including a trigger mechanism which is cocked when said layer cam is in a given position and which is fired upon command of said intermediate cam prior to the next advance of said layer cam.

21. A method of packing a plurality of tea bags or the like in a carton, said method comprising the steps of controllably guiding each bag edge-first, one at a time into the carton and bringing the bag to rest along its bottom edge at a desired position within the carton, and then after the bag has been brought to rest, laying it on its side and disengaging it to leave it in a desired orientation within the carton, and then repeating these steps with other bags, each of said other bags being deposited relative to every other bag to give minimum waste space.

22. A method of packing a plurality of tea bags or the like in a carton, said method comprising the steps of dropping each bag edge-first down a guide chute, and moving the chute in timed relation to the falling of each bag to place it in a respective predetermined position within the carton, the lower end of said chute being oscillated back and forth continuously along a track of approximately constant amplitude and shifting lateral position, and also being oscillated up and down continuously along a path of approximately constant length but changing vertical position.

References Cited in the file of this patent

UNITED STATES PATENTS

| | | |
|---|---|---|
| 1,133,273 | Flaherty | Mar. 30, 1915 |
| 1,305,152 | Nielsen | May 27, 1919 |
| 1,621,257 | Knowlton et al. | Mar. 15, 1927 |
| 1,926,060 | Peters | Sept. 12, 1933 |
| 2,428,103 | Vergobbi | Sept. 30, 1947 |
| 2,509,069 | Mrachek | May 23, 1950 |